United States Patent [19]

Nurnberger et al.

[11] 4,146,270

[45] Mar. 27, 1979

[54] CONTROL DEVICE FOR TURBINES WITH SPEED AND LOAD CONTROL

[75] Inventors: Rainer Nürnberger, Nüremberg; Miroslav Nypl, Zirndorf, both of Fed. Rep. of Germany

[73] Assignee: Maschinenfabrik Augsburg-Nüremberg Aktiengesellschaft, Nüremberg, Fed. Rep. of Germany

[21] Appl. No.: 808,326

[22] Filed: Jun. 20, 1977

[30] Foreign Application Priority Data

Jun. 19, 1976 [DE] Fed. Rep. of Germany ....... 2627591

[51] Int. Cl.² .............................................. F02N 11/06
[52] U.S. Cl. .................................. 290/40 R; 60/664; 318/610
[58] Field of Search ................................. 60/664–667; 290/40; 318/610

[56] References Cited

U.S. PATENT DOCUMENTS

| | | | |
|---|---|---|---|
| 3,545,207 | 12/1970 | Barber et al. | 60/664 |
| 3,802,189 | 4/1974 | Jenkins | 60/665 |
| 4,049,971 | 9/1977 | de Vivy | 290/40 R |

Primary Examiner—Robert K. Schaefer
Assistant Examiner—John W. Redman
Attorney, Agent, or Firm—Walter Becker

[57] ABSTRACT

A control device for turbines with speed and load control, in which the load control includes an integrator with or without an output value limiter. The speed control and the load control are functionally independent of each other over the entire working range. The speed control likewise includes an integrator, and the outputs of the two controls are conveyed to a MIN-member as input signals while the smaller input becomes the output signal of the MIN-member and takes over the positioning of the turbine inlet valve.

7 Claims, 3 Drawing Figures

CONTROL DEVICE FOR TURBINES WITH SPEED AND LOAD CONTROL

The present invention relates to a control device for turbines with speed and load control, in which the load control includes an integrator with or without an output value limiter. With previous control devices of the above mentioned general type, the turbine speed controler or governor is a proportionally acting controller. Furthermore, there is provided a speed control branch bypassing the load control; for a direct speed control of the turbine in case of a change in the load the load controller is subordinated to the speed controller. The influence of the subordinated load controller is limited to about from 10 to 20% when measured by the signal level of the turbine speed controller.

It is an object of the present invention to provide a control device for turbines with which during sudden turning off of loads, it will be prevented with certainty any occurrence of excessive speeds of such a magnitude, such that the protective devices (quick shut-off) become effective.

Figure 1:
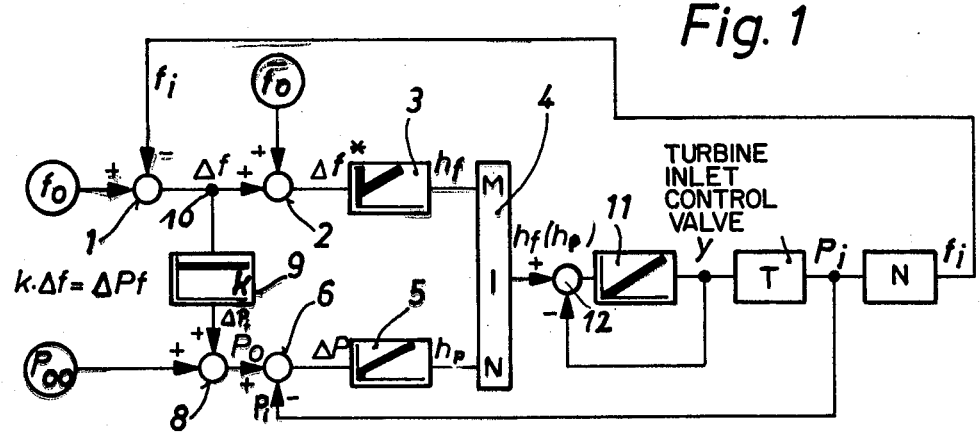

This object and other objects and advantages of the invention will appear more clearly from the following specification in connection with the accompanying drawing, in which:

FIG. 1 diagrammatically illustrates the frequency and power control circuit according to the invention of a turbine in interconnected operation.

Figure 2:
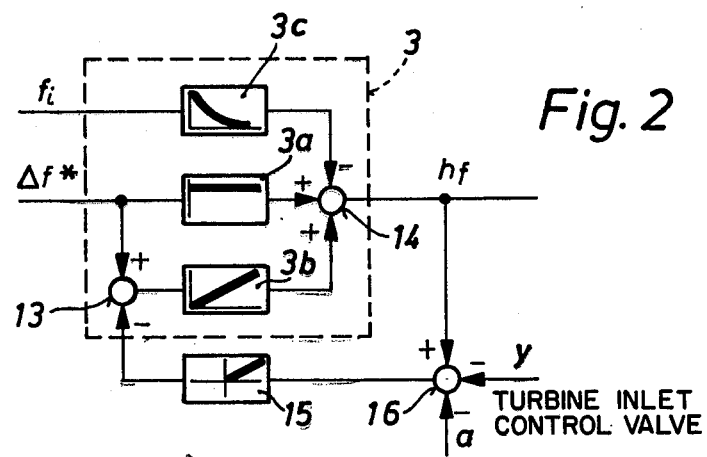

FIG. 2 diagrammatically illustrates an advantageous design of the turbine speed controller contained in FIG. 1.

Figure 3:
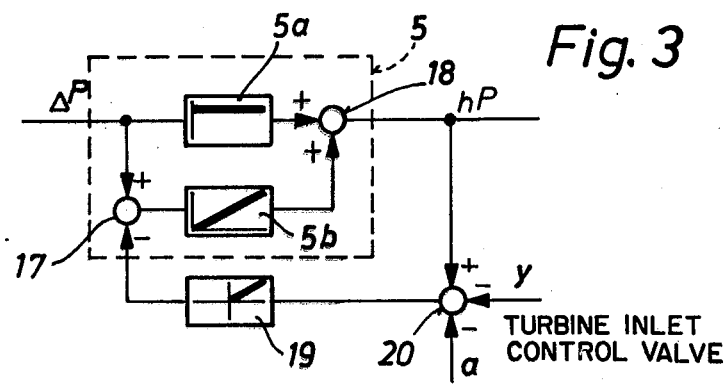

FIG. 3 diagrammatically illustrates an advantageous design of the load controller contained in FIG. 1.

The control device according to the present invention is characterized primarily in that the turbine speed controller and the load controller over the entire working range functionally are independent of each other. Furthermore, the speed controller includes an integrator, and the adjustable quantities of turbine speed or regulated quantities of the two control devices are conveyed to a MIN member as input signals while the smaller adjustable quantities as output signal of the MIN (minimum) member take over the guiding of the positioning element of the control for the adjustable quantities.

The control device with the above mentioned features according to the invention brings about the following advantages:

(Ia) The speed and power output control can both be designed for an optimum result for each problem to be solved.

(b) The influence of the frequency can be turned off using a turbine inlet control valve when only a pure output control is desired while the safety of the plant is assured by the speed control standing in "readiness" for becoming active inasmuch as the turbine inlet control valve keeps the non-active control in "readiness".

(IIa) The turbine speed precisely corresponds to the predetermined rated value.

(b) The over speed occurring after turning off a load can be kept very low for instance at a value amounting to within 1% of the operational speed.

(c) When the network frequency increases beyond the freely selectable value, the taking over by the speed control is effected automatically.

(III) The integrator of the load controller must not be limited, so that by means of the load controller, also with low rated values, a full opening of the turbine inlet control valve will be possible.

According to an advantageous further development of the invention, both controls respectively include a starting value limiting device for limiting the output of one control relative to the output of the other control so that the non-active control will be trailing the leading control by way of the corresponding limiting circuit sliding over the entire range. As a result thereof, over oscillation of the respective turbine inlet control valve is reduced inasmuch as said turbine inlet valve keeps the non-active control in readiness for becoming active.

According to a further advantageous feature of the present invention, the trailing of the variable of the control which is not active is effected at a distance of from 5 to 20% with regard to the stroke of the inlet valve positioning member.

In order to improve the idling stability of the turbine, according to a further feature of the invention, the turbine speed controller is a proportionally integrally effective control with differential influence or phase lead (PID control or proportional plus reset plus rate action controller).

Furthermore, the derivative action (differential influence or phase lead) permits the speed control, in case of a switching-off of the load, to become active faster because the control output is reduced immediately in response to an acceleration.

According to a further development of the invention, the load controller is designed as a proportionally integrally effecting PI control (proportional plus reset action controller).

Referring now to the drawing in detail, at a totaling station 1, there is obtained the difference between the said frequency rated value $f_o$ and the frequency actual value $f_i$ of the network N which corresponds to the rated and actual frequencies of rotation (speed), $n_o$ and $n_i$. This difference $\Delta f (\Delta f = f_o - f_i)$ is in the form of a preferably electrical signal conveyed to a totaling station 2 to which additionally is conveyed a further electrical signal which is associated with a predeterminable variable frequency $\overline{f_o}$; $\overline{f_o}$ is conveyed in the form of a negative value since $\Delta f$ is likewise negative). At the output of the totaling station or member there is applied an electric signal which corresponds to the total $\Delta f^*$ of the two frequencies $\Delta f$ and $f_o$. This frequency differential signal $\Delta f^*$ is conveyed to the inlet of the turbine speed controller which in this instance is designed as proportionally integrally effective control with differential influence or phase lead, in other words, a so-called PID (proportional plus reset plus rate action controller) control. The structure of a PID (proportional plus reset plus rate action controller) control is well known so that a description thereof appears to be superfluous. The output signal (adjustable magnitude signal) $h_f$ of the turbine speed controller 3 is, without delay, conveyed to the inlet of a block 4 which is designed as an electric MIN element, well known in the art. The block 4 furthermore comprises a second inlet to which will be conveyed the signal of the adjustable magnitude of a load controller 5. To the inlet of the load controller 5 which latter is designed as proportionally effective control (PI control) there is conveyed a power differential signal $\Delta P$. The signal $\Delta P$, at a totaling station 6, is formed as the difference of the power rated value $P_o$ and the power actual value $P_i$. The power actual value $P_i$ is conveyed from the exit of the turbine to the totaling station 6. The power rated value signal $P_o$ is formed at a totaling station 8 as the total of a predetermined adjustable power base from $P_{oo}$, which is considerably less than the power rated value $P_o$, and a modified rotational frequency error signal $\Delta P_f$. The signal $\Delta P_f$ is conveyed without delay to the totaling station 8 from the exit of a block 9 which is designed as proportional control (P=control). In the block 9, the inlet signal $\Delta f$ is multiplied by a factor k so that at the exit of the block 9 the signal $\Delta P_f = k \times \Delta f$ is present. The input signal $\Delta f$ is that frequency differential signal formed at the totaling station 1, which is conveyed from the branch section 10 of the turbine speed control circuit to the block 9.

The block 4 which is formed as an electric MIN member of a well known type acts in such a way that always only the smaller one of the signals of the adjustable magnitudes $h_f$ or $h_p$ of the two controllers 3,5 is available at the output of the MIN member. The corresponding adjustable magnitude ($h_p$ or $h_f$) is conveyed in a manner known per se to a control 11 for the adjustable magnitude. In this connection, the adjustable magnitude is at a totaling station 12 is continuously compared to the variable positioning valve y, and the valve is adjusted until the difference $h_f$ (or $h_p$) − y becomes zero, and until the desired value of the valve position of the valve has been obtained. The control device according to FIG. 1 for the speed control operates in the following manner:

(1) Idling

The turbine rotates without load in the same direction in which it rotates during full operation (turn operation) at a rotational frequency (speed) of from 50 to 60 l/min and is subsequently increased to a rotational frequency of 3000 l/min. During idling, $P_i = O$. Since the power base value $P_{oo}$ is predetermined as a constant value for instance 10% of $P_i$, the power differential value signal $\Delta P$ is constant at the totaling station 6. The signal $\Delta P$ is conveyed to the power control 5 where in conformity with the power course in the PI-control, an adjustable magnitude or an adjustable magnitude signal $h_p$ is applied to the inlet of the MIN member, which adjustable magnitude or signal is higher than the signal $h_f$ from the turbine speed controller 3.

Inasmuch as in the MIN member only the smaller signal passes through, in other words $h_f$, the increase in speed of the turbine is obtained by the fact that the frequency $\overline{f}_o$ is increased automatically in conformity with a predetermined program or by an operator. If $\overline{f}_o$ is increased, the valves are opened to a greater extent and the rotational frequency (speed) of the turbine rotor is increased. The frequency $\overline{f}_o$ is increased until the rotational frequency (speed) of the turbine rotor corresponds to the network frequency of 50 Hz.

(2) The turbine set is synchronized with the network and is under load.

The frequencies $f_o$ are predetermined and $f_i$ and $\Delta f$ are constant. The frequencies $\overline{f}_o$ are further increased. Consequently, they increase to $\Delta f^*$ and $h_f$. The adjustable magnitude $h_f$ is still less than $h_p$. Therefore, the valves open further than corresponds to the idling point, and electric power is dispensed. During the time in which $P_i$ increases, the value $\Delta P$ becomes less and finally negative. However, as soon as $\Delta P$ becomes negative, the variable $h_p$ of the load controller 5 takes over the control over the variable of the variable control 11.

(3) Sudden turning off of the load for instance when changing from interconnected operation to isolated operation.

The electric power is zero. However, since the full mechanical power of the turbine is still present, care has to be taken that the rotary speed will be as small as possible when a sudden relief occurs but at a value at least less than that of the quick shut-off speed.

Since the electric power equals zero, $\Delta P$ and $h_p$ are high. The adjustable magnitude signal $h_p$ will then at any rate be greater than the adjustable magnitude signal $h_f$. When the load of the turbine by the generator is eliminated, it will be appreciated that, if no corresponding steps have been taken, the rotary frequency of the turbine would increase. With the control device according to the invention through the derivative action of the turbine speed controller 3, the outlet of the turbine speed controller will immediately control in a decreasing sense and would control the turbine at a rotary frequency set by $\overline{f}_o$, which means that the rotary frequency which increased in view of the reduction of the load would immediately be reduced again.

FIG. 2 shows the turbine speed controller 3 enlarged over FIG. 1. The turbine speed controller 3 has a proportionally effective element 3a, an integrally effective member 3b, a differential member (derivative action member) 3c, and two totaling stations 13 and 14. At the totaling station 14 there is provided the formation of a difference between the total respectively of the P- and I- part of element 3a, of member 3b and the D-part of member 3c. The rotary frequency signal $\Delta f^*$ is conveyed to the inlet of the proportionally effective element 3a. The rotary frequency signal $f_i$ is conveyed to the inlet of the derivative action member 3c. At the totaling station 13, the difference is formed between $\Delta f^*$ and the starting value of the block 15. The block 15 corresponds to the block 19 of FIG. 3. Conveyed to the inlet of block 15 is a signal which is formed at the totaling station 16 from the difference of the signals of the adjustable magnitude $h_f$ of the turbine speed controller and the sum of the valve position y and a constant predetermined value a.

FIG. 3 shows the load controller 5 on a larger scale than FIG. 1. The load controller 5 has a proportionally effective part 5a and an integrally effective part 5b as well as two totaling stations 17, 18. The totaling station 17 is electrically connected to the output of the block 19, the input signal 6 of which is formed at a totaling station 20. At the totaling station 20 the total of the valve position y and a constant predetermined value a is detected from the variable $h_p$ of the load controller. Block 19 represents a known electric device at the output of which a signal will be formed only when the signal at the inlet is positive. At the totaling station 17, the difference is formed between the power differential signal $\Delta P$ and the starting signal of block 19. At the totaling station 18, the outlet signals of the P and I part are totalled.

It is, of course, to be understood that the present invention is, by no means, limited to the specific showing in the drawings, but also comprises any modifications within the scope of the appended claims. Thus, for instance the rotary controllers 3,5 may also be designed as proportionally integrally effective controls (P- and I-controllers). The controls 3,5 may be analog, digital, or analog/digital turbine controllers. Electric as well as hydraulic or pneumatic controls may be utilized.

Furthermore, block 9 could be omitted but customarily it will be utilized in block power plants.

If block 9 is omitted, also $\bar{f}_o$ as well as the totaling stations 2 and 8 likewise can be omitted.

Instead of an electric MIN member, also a mechanical MIN member of any known and suitable type may be utilized.

What we claim is:

1. A control device for turbines, which includes: a load controller comprising an integrator, a turbine speed controller likewise having an integrator, said speed controller and said load controller being functionally independent of each other over their entire working range, a MIN-element, and means for conveying the adjusted magnitudes of said speed controller and said load controller to said MIN-element, the smaller variable as output of said MIN-element taking over the guiding of the positioning element of the control for the turbine speed.

2. A device according to claim 1, in which each said load controller and speed controller have an output value limiter for limiting the output value of one controller relative to the output value of the other controller so that the respective out-of-engagement controller through the intervention of the respective limiter trails while sliding over the entire working range.

3. A device according to claim 2, in which the trailing of the adjustable magnitude of the out-of-engagement controller is effected at a distance of from 5 to 20% of the stroke of said positioning element.

4. A device according to claim 1, in which said speed controller is a proportionally- integrally effective control with differential influence.

5. A device according to claim 1, in which said speed controller is a proportionally- integrally effective control.

6. A device according to claim 1, in which said speed controller is a proportional-integrally-effective derivative control.

7. A device according to claim 1, in which said load controller is a proportionally- integrally effective control (PI-control).

* * * * *